United States Patent [19]

OKada et al.

[11] Patent Number: 5,136,386
[45] Date of Patent: Aug. 4, 1992

[54] VIDEO SIGNAL NOISE REDUCTION CIRCUIT PRECEDED BY A PICTURE QUALITY CONTROL CIRCUIT

[75] Inventors: Teruo Okada, Fujioka; Masato Shimizu, Kumagaya, both of Japan

[73] Assignee: Kabushiki Kaisha Toshiba, Kawasaki, Japan

[21] Appl. No.: 597,521

[22] Filed: Oct. 12, 1990

[30] Foreign Application Priority Data

Oct. 12, 1989 [JP] Japan .................. 1-263961

[51] Int. Cl.$^5$ .......................................... H04N 5/213
[52] U.S. Cl. ......................... 358/167; 358/166; 358/36; 358/37
[58] Field of Search ............. 358/167, 166, 36, 37

[56] References Cited

U.S. PATENT DOCUMENTS

| | | | |
|---|---|---|---|
| 3,932,819 | 1/1976 | Spencer | 358/36 |
| 4,007,485 | 2/1977 | Sato | 358/36 |
| 4,667,225 | 5/1987 | Kanda | 358/167 |
| 4,768,094 | 8/1988 | Ichinoi | 358/167 |

FOREIGN PATENT DOCUMENTS 0328346 7/1989 European Pat. Off. .

OTHER PUBLICATIONS

Patent Abstracts of Japan, vol. 8, No. 17 (E-223), Jan 25, 1984.
Patent Abstracts of Japan, vol. 12, No. 291 (E-644), Aug. 9, 1988.

*Primary Examiner*—Howard W. Britton
*Assistant Examiner*—Sherrie Hsia
*Attorney, Agent, or Firm*—Banner, Birch, McKie & Beckett

[57] ABSTRACT

A noise canceller circuit is connected in a stage succeeding a picture quality control circuit to which the video signal is input. A noise cancel amount for the video signal can be controlled so as to correspond to the gain in the frequency characteristic at the same time when the adjustment of the frequency characteristic of the video signal is performed in the picture quality control circuit. As a result, the noise cancel amount in the nosie canceller circuit can be controlled correspondingly to the level of the noise component even if a level of the noise component in the video signal is changed when the gain in a certain bandwidth of the video signal is adjusted in the picture quality control circuit. Therefore, the noise component can be cancelled effectively.

3 Claims, 2 Drawing Sheets

VIDEO SIGNAL NOISE REDUCTION CIRCUIT PRECEDED BY A PICTURE QUALITY CONTROL CIRCUIT

BACKGROUND OF THE INVENTION

1. Field of the Invention

The present invention relates to a video signal noise reduction circuit for use in a video tape recorder, a video movie, and the like.

2. Description of the Related Art

In a video tape recorder, as shown in FIG. 1, a picture quality control circuit 51 is connected to a noise canceller circuit 52 in the succeeding stage. A regenerative video signal is input to the noise canceller circuit 52. The picture quality control circuit 51 adjusts the frequency characteristic of the video signal under the control of an external controller 53, thereby controlling the quality of a picture. A gain for the video signal is usually controlled in a certain bandwidth by the external controller 53. The noise canceller circuit 52 regards a video signal at a level lower than a predetermined level (limiter level) as a noise component, and extracts a noise component from the video signal to cancel the noise component.

The noise canceller circuit 52 is not ordinarily designed to delete the noise component completely, and a minute noise component is often left. For example, it reduces the noise component to −10 dB level. Therefore, if the picture quality control circuit 51 is connected to the noise canceller circuit 52 in the succeeding stage, the minute noise component which has been without being cancelled are amplified by the picture quality control circuit 51 and impair the picture quality. Furthermore, even if another noise canceller circuit (not shown) similar to the noise canceller circuit 52 is connected to the output of the picture quality control circuit 51, the conventional noise canceller circuit 52, which has above fixed limiter level, performs but incomplete cancellation of the noise component. This is because the level of the noise component included in the video signal should be changed according to the gain control of the picture quality control circuit 51.

SUMMARY OF THE INVENTION

Accordingly, it is an object of the present invention to provide a video signal noise reduction circuit which can cancel the noise component of a video signal effectively, to thereby improve the picture quality, even when the level of the noise component is controlled in the picture quality control circuit by adjusting the frequency characteristic of the video signal.

In the noise reduction circuit of the present invention, a noise canceller circuit is connected in a stage succeeding to the picture quality control circuit into which the video signal is input. The present invention is characterized in that the amount of noise which the noise canceller circuit cancels is controlled at the same time when the control of the gain in the frequency characteristic of the video signal is controlled in the picture quality control circuit. As a result, even if the level of the noise component of the video signal is controlled by adjusting the gain in the certain bandwidth of the video signal in the picture quality control circuit, the noise component can be effectively cancelled since the cancel amount of the noise in the noise canceller circuit can be controlled in accordance with the level of the noise component.

According to the present invention, there is provided a video signal noise reduction circuit, which comprises:

picture quality control means for controlling the gain of the frequency bandwidth of an input video signal;

noise cancelling means connected in a stage succeeding the picture quality control means, for cancelling the noise component in the video signal input from the picture quality control means; and external controlling means connected to both the picture quality control means and the noise cancelling means, for controlling the amount of noise which the noise cancelling means is to cancel, in accordance with the gain adjustment in the frequency bandwidth of the video signal which is controlled by the picture quality control means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will be described hereinafter with reference to the accompanying drawings.

Figure 1:
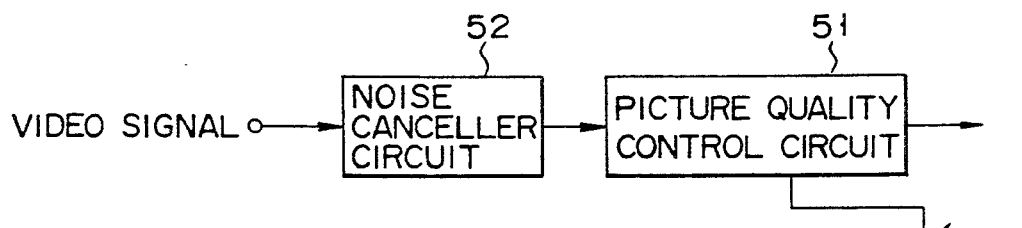
FIG. 1 is a block diagram showing a conventional arrangement of a picture quality control circuit 51 and a noise canceller circuit 52.
Figure 2:
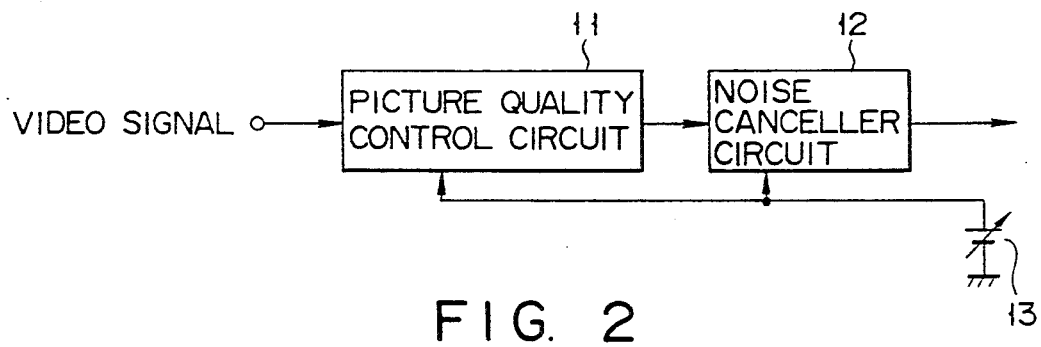
FIG. 2 is a block diagram showing a first embodiment of a video signal noise reduction circuit of the present invention.

FIG. 2 is a block diagram showing a first embodiment of a noise reduction circuit for video signal of the invention. This circuit comprises a picture quality control circuit 11 to which a regenerative video signal is input from the video tape recorder etc., a noise canceller circuit 12 connected in a stage succeeding the picture quality control circuit 11, and an external controller 13. A conventional noise canceller circuit (not shown) is usually connected in a stage preceding the picture quality control circuit 11. The external controller 13 comprises, for example, a variable resistor for controlling a voltage, and is connected to both the picture quality control circuit 11 and the noise canceller circuit 12. The picture quality control circuit 11 controls the picture quality in accordance with the frequency characteristic of the video signal controlled by the external controller 13. The picture quality control circuit 11 controls the gain in a certain frequency bandwidth of the video signal. The noise canceller circuit 12 regards the video signal, which is input from the picture quality control circuit 11 and which is at a level lower than a predetermined level (limiter level), as a noise component. The circuit 12 extracts a noise component from the video signal to cancel the noise component. More specifically, the circuit 12 substracts the noise component from the original video signal, i.e., the video signal supplied from the picture quality control circuit 11.

The amount of noise which the noise canceller circuit 12 cancels is controlled by the external controller 13 in accordance with the gain of the frequency characteristic of the video signal at the same time when the frequency characteristic of the video signal is adjusted in the picture quality control circuit 11.

Figure 3:
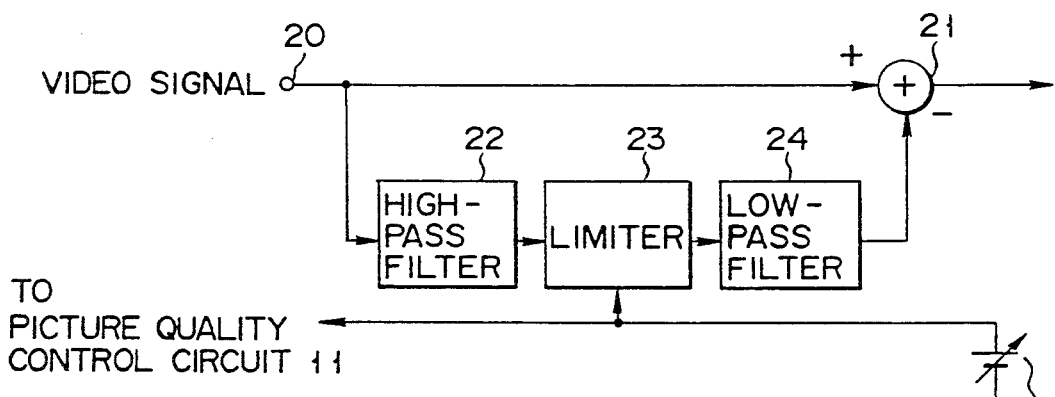
FIG. 3 is a block diagram showing a second embodiment of a video signal noise reduction circuit of the present invention.

FIG. 3 is a block diagram showing a second embodiment of a noise reduction circuit for video signal of the present invention. This noise reduction circuit comprises a picture quality control circuit 11 and an external controller 13 which are identical to those of the first embodiment shown in FIG. 2. The noise canceller circuit 12 comprises an input terminal 20 which receives a video signal from the picture quality control circuit 11, an adder/subtracter 21 one input terminal of which receives the video signal from the input terminal 20, a high-pass filter 22 which passes high-frequency component of the video signal, a limiter 23 which extracts any video signal at a level lower than a predetermined level, and a low-pass filter 24 which passes low-frequency component of the video signal. The high-pass filter 22, the limiter 23 and the low-pass filter 24 are sequentially connected between the input terminal 20 and the other input terminal of the adder/subtracter 21. The limiter level of the limiter 23 is controlled in accordance with the gain of the frequency characteristic of the video signal in the picture quality control circuit 11, which is adjusted by the external controller 13.

Accordingly, the amount of noise to be cancelled from the input video signal can be controlled in the noise canceller circuit 12, by subtracting the noise component extracted on the basis of the level-controlled limiter level from the video signal supplied from the picture quality control circuit 11 through the input terminal 20.

Figure 4:
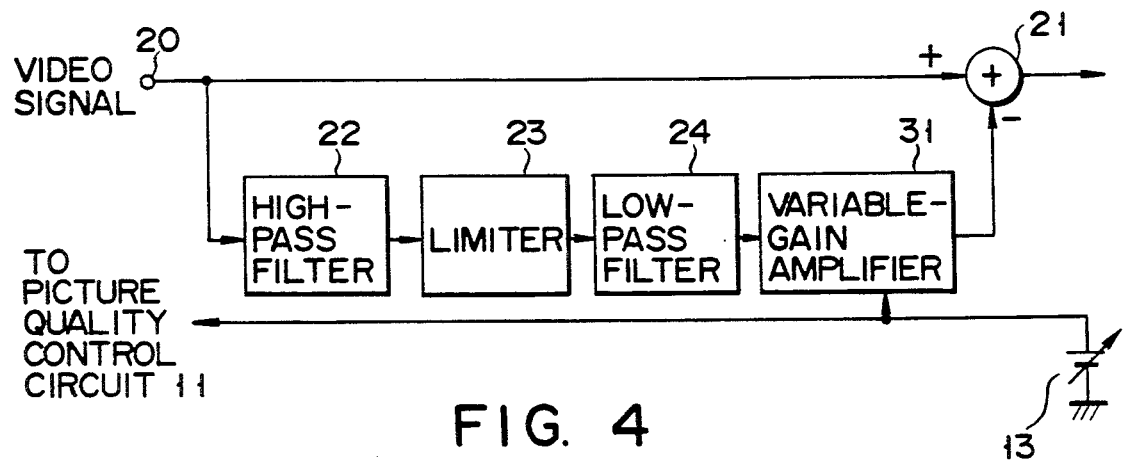
FIG. 4 is a block diagram showing a third embodiment of a video signal noise reduction circuit of the present invention.

FIG. 4 is a block diagram showing a third embodiment of a noise reduction circuit of the present invention. The third embodiment also comprises a picture quality control circuit 11 and an external controller 13 which are identical to those of the first embodiment shown in FIG. 2. In a noise canceller circuit 12 in FIG. 4, a variable gain amplifier 31 is inserted in a stage succeeding the low-pass filter 24. A gain of the variable gain amplifier 31 can be controlled by the external controller 13 in accordance with the gain in the frequency characteristic of the video signal, which is controlled by the picture quality control circuit 11.

Accordingly, the level of the noise, which is extracted on the basis of a predetermined limiter level from the video signal supplied from the picture quality control circuit 11, can be controlled by the variable gain amplifier 31 in accordance with the controlled gain in the frequency characteristic of the video signal. Therefore, the cancel amount of the noise can be controlled by substracting the level-controlled noise from the video signal supplied from the picture quality control circuit 11.

The operation of the noise reduction circuit for video signal of the present invention will be described hereinafter with reference to the frequency characteristics in FIGS. 5A and 5B.

Figure 5A:
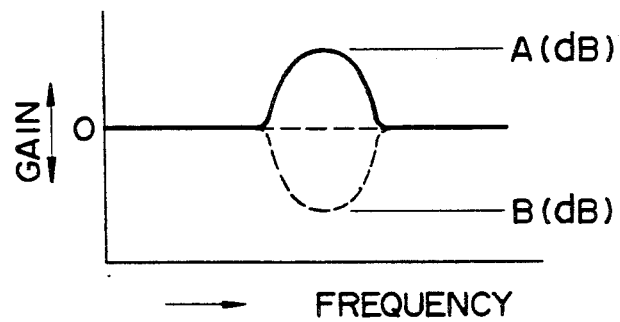
FIG. 5A is a diagram showing the frequency characteristic of the picture quality control circuit 11 in of the present invention.
Figure 5B:
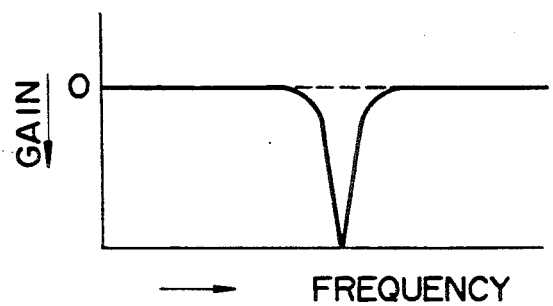
FIG. 5B is a diagram showing the frequency characteristic of the noise canceller circuit 12 in the present invention.

FIG. 5A shows the frequency-gain characteristic of the picture quality control circuit 11, and FIG. 5B shows that of the noise canceller circuit 12. Upon control of the picture quality, the frequency characteristic of the picture quality control circuit 11 can be controlled by the external controller 13. In this case, the gain in a certain bandwidth of the video signal can be usually controlled as is shown in FIG. 5A. Three cases are shown in FIG. 5A. The gain A shows that the video signal level in the certain bandwidth is increased to the maximam level a ($20\log_{10}a = A$). The gain B shows that the video signal level in such bandwidth is decreased to the minimum level b ($20\log_{10}b = B$). The flat gain as an intermediate level shows that the video signal level in such bandwidth is not adjusted. The gain of the certain bandwidth of the video signal can be controlled by the picture quality control circuit 11 to change the level of the noise component mixed in the video signal.

In the present invention, the noise canceller circuit 12 can be controlled by means of the external controller 13 at the sam time when the picture quality is controlled by the picture quality control circuit 11. As a result, the noise cancel level in the noise canceller circuit 12 can be changed correspondingly to the level of the noise component of the video signal. In particular, the limiter levels set in the noise canceller circuit 12 can be controlled to the levels a and b, respectively, when the gains in the frequency characteristic of the video signal are controlled to the maximum gain A and the minium gain B by the picture quality control circuit 11. The noise canceller circuit 12 can therefore cancel the noise component effectively, as is shown in FIG. 5B, to thereby improve the picture quality.

Additional advantages and modifications will readily occur to those skilled in the art. Therefore, the invention in its broader aspects is not limited to the specific details, representative devices, shown and described herein. Accordingly, various modifications may be without departing from the spirit or scope of the general inventive concept as defined by the appended claims and their equivalents.

What is claimed is:

1. A noise reduction circuit for video signals comprising:
   picture quality control means for controlling a gain adjustment of a frequency bandwidth of an input video signal;
   noise cancelling means connected in a stage succeeding said picture quality control means, for cancelling a noise component in a gain adjusted video signal inputted from said picture quality control means; and
   controlling means connected to both said picture quality control means and said noise cancelling means, for controlling both an amount of noise which said noise cancelling means is to cancel and an amount of said gain adjustment of said frequency bandwidth of said video signal in said picture quality control means, independent from said input video signal.

2. A noise reduction circuit according to claim 1, wherein said noise cancelling means comprises:
- a video signal input terminal connected in a stage succeeding said picture quality control means, for receiving a video signal supplied from said picture quality control means;
- a high-pass filter connected to said video signal input terminal, for passing high-frequency component of said video signal;
- a limiter connected to an output terminal of said high-pass filter, for extracting, as a noise component, a signal from said video signal, which is at a level lower than limiter level controlled by said controlling means at the same time of an adjustment in said picture quality control means;
- a low-pass filter connected to an output terminal of said limiter, for passing low-frequency component of said video signal; and
- an adder/subtracter, one input terminal of which is connected to said video signal input terminal and the other input terminal of which is connected to an output terminal of said low-pass filter, for subtracting said noise component extracted on the basis of said level-controlled limiter level, from said video signal supplied from said video signal input terminal.

3. A noise reduction circuit according to claim 1, wherein said noise cancelling means comprises:
- a video signal input terminal connected in a stage succeeding said picture quality control means, for receiving a video signal from said picture quality control means;
- a high-pass filter connected to said video signal input terminal, for passing high-frequency component of said video signal;
- a limiter connected to an output terminal of said high-pass filter, for extracting a signal from said video signal, which is at a level lower than a limiter level;
- a low-pass filter connected to an output terminal of said limiter, for passing low-frequency component of said video signal;
- a variable gain amplifier having a gain controlled by said controlling means at the same time of an adjustment in said picture quality control means, for controlling a noise level on extracted the basis of said limiter level; and
- an adder/subtracter, one input terminal of which is connected to said video signal input terminal and the other input terminal of which is connected to an output terminal of said variable gain amplifier, for subtracting said noise component extracted on the basis of said limiter level controlled by said amplifier, from said video signal supplied from said video signal input terminal.

* * * * *